United States Patent
Lewis et al.

(10) Patent No.: US 10,360,488 B2
(45) Date of Patent: Jul. 23, 2019

(54) SYSTEMS AND METHODS FOR MONITORING CONDITION COMPLIANCE VIA RFID TAG

(71) Applicant: Walmart Apollo, LLC, Bentonville, AR (US)

(72) Inventors: Steven J. Lewis, Bentonville, AR (US); Tom Stiefel, Bentonville, AR (US); Alvin S. Taulbee, Springdale, AR (US); Jeremy R. Tingler, Bentonville, AR (US); Eugene P. Sunday, Glen Ellyn, IL (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/144,598

(22) Filed: Sep. 27, 2018

(65) Prior Publication Data

US 2019/0095770 A1  Mar. 28, 2019

Related U.S. Application Data

(60) Provisional application No. 62/564,802, filed on Sep. 28, 2017.

(51) Int. Cl.
*G06K 19/07* (2006.01)
*G06Q 50/28* (2012.01)
(Continued)

(52) U.S. Cl.
CPC ......... *G06K 19/0717* (2013.01); *G01K 1/024* (2013.01); *G06K 19/045* (2013.01); *G06Q 10/0832* (2013.01); *G06Q 50/28* (2013.01)

(58) Field of Classification Search
CPC .. G06K 19/0717; G06K 19/045; G01K 1/024; G06Q 10/0832; G06Q 50/28
See application file for complete search history.

(56) References Cited

U.S. PATENT DOCUMENTS 7,570,169 B2  8/2009  Li
8,482,429 B2  7/2013  Aguren
(Continued)

FOREIGN PATENT DOCUMENTS

WO  2002073523  9/2002

OTHER PUBLICATIONS

Bjorninen, Toni et al.; "Signal strength readout and miniaturised antenna for metalmountable UHF RFID threshold temperature sensor tag"; IET Digital Library; vol. 51, Issue 22; Published Oct. 22, 2015; pp. 1-2.
(Continued)

*Primary Examiner* — Curtis B Odom
(74) *Attorney, Agent, or Firm* — Fitch, Even, Tabin & Flannery LLP

(57) ABSTRACT

In some embodiments, systems, apparatuses, and methods are provided herein useful to monitoring condition compliance. In some embodiments, an RFID tag comprises a first chip and a second chip, an antenna, a switch, wherein the switch is configured to switchably connect the first chip and the second chip to the antenna based on occurrence of a condition, a memory device, and a control circuit configured to write, in response to a connection between the first chip and the antenna, a first marker and an indication of a first state to the memory device, write, in response to a connection between the second chip and the antenna, a second marker and an indication of a second state to the memory device, determine an amount of time in which compliance was not met, and transmit, to an RFID reader, an indication of the amount of time in which compliance was not met.

20 Claims, 3 Drawing Sheets

(51) Int. Cl.
  *G06K 19/04* (2006.01)
  *G01K 1/02* (2006.01)
  *G06Q 10/08* (2012.01)

(56) References Cited

U.S. PATENT DOCUMENTS

| | | |
|---|---|---|
| 8,931,953 B2 | 1/2015 | Law |
| 9,013,087 B2 | 4/2015 | Fish |
| 9,317,729 B2 | 4/2016 | Krusor |
| 2007/0215709 A1 | 9/2007 | Baude |
| 2007/0257803 A1 | 11/2007 | Munro |
| 2009/0027162 A1 | 1/2009 | Forster |
| 2010/0123561 A1 | 5/2010 | Nam |
| 2010/0123583 A1* | 5/2010 | Bommer ............ G06K 19/0717 340/572.7 |
| 2010/0315243 A1 | 12/2010 | Tokhtuev |
| 2012/0112906 A1 | 5/2012 | Borke |
| 2018/0308042 A1* | 10/2018 | Taulbee ............... G06Q 10/087 |

OTHER PUBLICATIONS

PCT; App, No. PCT/US2018/052419; International Search Report and Written Opinion dated Dec. 4, 2018.

\* cited by examiner

SYSTEMS AND METHODS FOR MONITORING CONDITION COMPLIANCE VIA RFID TAG

CROSS-REFERENCE TO RELATED APPLICATION

This application claims the benefit of U.S. Provisional Application No. 62/564,802, filed Sep. 28, 2017, which is incorporated by reference in its entirety herein.

This invention relates generally to radio frequency identification (RFID) technology and, more specifically, to RFID tags.

BACKGROUND

In many industries, condition compliance is important to ensure that goods offered for sale are suitable to sell. One common example is cold chain compliance for refrigerated goods. If refrigerated goods are not maintained at an appropriate temperature, the refrigerated goods may spoil or become unsafe for consumption, making them unsuitable for sale. Just as refrigerated goods require certain temperature requirements, other products may require a variety of other condition (e.g., humidity or moisture, light exposure, etc.) requirements. Typically, vehicles on which goods are transported include sensors that monitor condition compliance. However, because these sensors are on the vehicle, they may not be capable of monitoring condition compliance when the goods are outside the vehicle. For example, the cargo area of a truck may remain at an acceptable temperature, but the refrigerated goods may sit outside on a loading dock during loading and unloading. If the ambient temperature is high and it is a sunny day, the temperature of the refrigerated goods may exceed an acceptable level. Because the sensors are located in the cargo area of the vehicle and the cargo area remains at an acceptable temperature, the sensors in the vehicle may not accurately reflect the temperature of the refrigerated goods. Consequently, a need exists for a mechanism to better monitor the condition, such as the temperature, of goods.

BRIEF DESCRIPTION OF THE DRAWINGS

Disclosed herein are embodiments of systems, apparatuses and methods pertaining to a radio frequency identification (RFID) tag for monitoring condition compliance. This description includes drawings, wherein.

Figure 1:
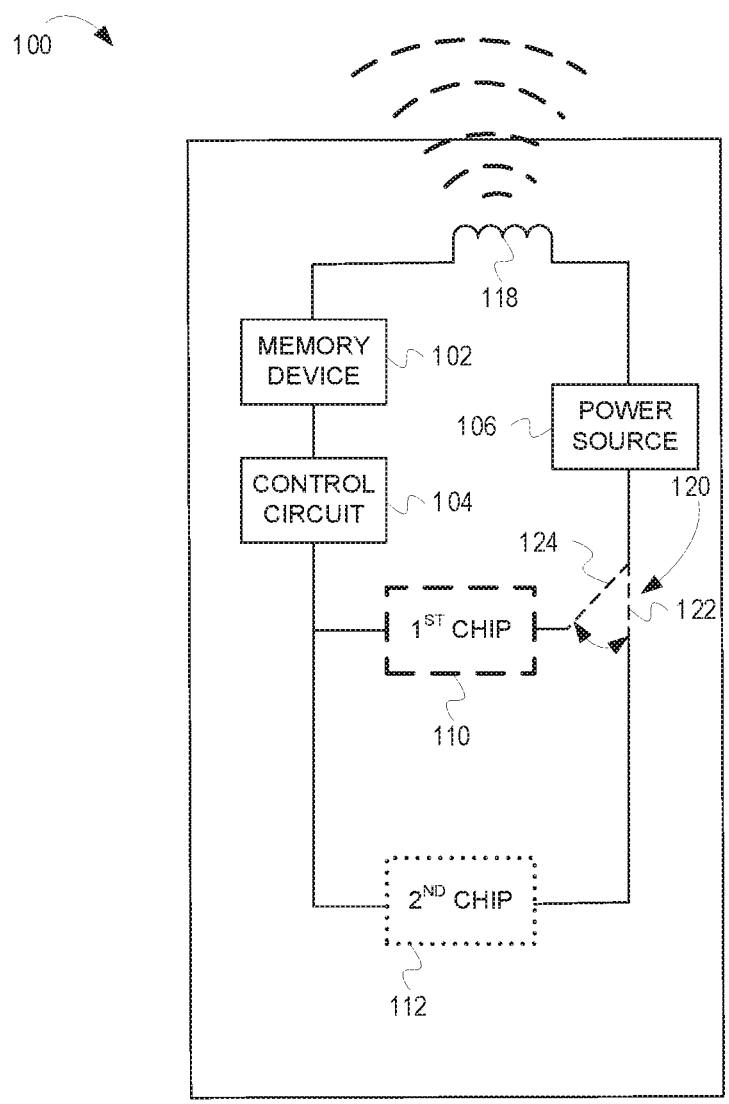
FIG. 1 depicts an RFID tag 100 for monitoring condition compliance, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to monitoring condition compliance. In some embodiments, an RFID tag for monitoring condition compliance comprises a first chip and a second chip, an antenna, a switch, wherein the switch is configured to switchably connect the first chip to the antenna and the second chip to the antenna based on occurrence of a condition, a memory device, and a control circuit configured to write, in response to a connection between the first chip and the antenna, a first marker and an indication of a first state to the memory device, write, in response to a connection between the second chip and the antenna, a second marker and an indication of a second state to the memory device, determine, based on the second marker and the first marker, an amount of time in which compliance was not met, and transmit, to an RFID reader, an indication of the amount of time in which compliance was not met.

As previously discussed, ensuring condition compliance can help prevent unfit goods from being offered for sale. Condition compliance can be based on a variety of different conditions, such as temperature, humidity or moisture level, magnetic field exposure, light exposure, etc. Because systems for monitoring condition compliance are typically located in or on a vehicle, current systems provide little information about condition compliance when products are not inside the vehicle. For example, sensors in the vehicle cannot easily monitor the condition of goods when the goods are being loaded or unloaded, or when the goods are being moved throughout a warehouse or retail facility. Described herein are systems, methods, and apparatuses that can be used to monitor condition compliance of goods when the goods are not in an environment in which condition sensors are present. Specifically, these systems, methods, and apparatuses utilize RFID tags to monitor condition compliance. Because the RFID tags are attached to the goods, or containers in which the goods are stored, the RFID tags are with the products even when the products are not inside a delivery vehicle. Consequently, The RFID tags can better monitor condition compliance for the goods than sensors inside a delivery vehicle. The discussion of FIG. 1 describes an example RFID tag that can be used to monitor condition compliance.

FIG. 1 depicts an RFID tag 100 for monitoring condition compliance, according to some embodiments. The RFID tag 100 includes a memory device 102 (also referred to herein simply as "memory"), a control circuit 104, a power source 106, a first chip 110, a second chip 112, an antenna 118, and a switch 120. The switch 120 switchably connects the first chip 110 to the antenna 118 and the second chip 112 to the antenna 118. The switch 120 toggles between the first chip 110 and the second chip 112 based on the occurrence of a condition. As depicted in FIG. 1, when the switch 120 is in a first position 124, the first chip 110 is connected to the antenna 118, and when the switch 120 is in a second position 122, the second chip 112 is connected to the antenna 118. When the condition occurs, the switch 120 can toggle from the first position 124 to the second position 122 (or vice versa). The condition can be any factor that is desired to be monitored. For example, the condition can be based on temperature, humidity or moisture level, magnetic field exposure, light exposure, etc. The componentry of the switch 120 can vary based on the condition to be monitored. For example, the switch can include a bimetallic strip, a conductive material, a liquid, a metallic liquid (e.g., mercury), a moisture sensor, a magnetic field sensor, etc.

Upon occurrence of the condition, the switch 120 switches from the second position 122 to the first position 124, connecting the first chip 110 to the antenna 118. Returning to the refrigerated food example, when the temperature exceeds a threshold (i.e., the condition occurs), the first chip 110 is connected to the antenna 118. When the first chip 110 connects to the antenna 118, the control circuit 104 writes a first marker in the memory 102. Additionally, the control circuit 104 can write an indication of a state to the memory 102. In the refrigerated food example, the indication can be of a first state (i.e., that the temperature has exceeded the threshold).

When the condition is no longer occurring (e.g., the temperature falls below the threshold), the switch 120 switches from the first position 124 to the second position 122, connecting the second chip 112 to the antenna 118. When the second chip 112 connects to the antenna 118, the control circuit 104 writes a second marker in the memory 102. Additionally, the control circuit 104 can write an indication of a state to the memory 102. In the refrigerated food example, the indication can be of a second state (i.e., that the temperature is no longer exceeding the threshold).

Based on the markers, the control circuit 104 can determine an amount of time in which compliance was not met. Returning to the refrigerated food example, when the temperature exceeded the threshold, the first chip 110 was connected to the antenna 118 and the control circuit 104 wrote a first marker and an indication of the first state to the memory 102. When the temperature fell below the threshold, the second chip 112 was connected to the antenna 118 and the control circuit 104 wrote a second marker and an indication of the second state to memory 102. In embodiments in which the markers include an indication of a time (e.g., a timestamp), the control circuit 104 can determine the period of time in which the compliance was not met. That is, the control circuit can determine the amount of time that had elapsed between when the first chip 110 was connected to the antenna 118 and the second chip 112 was connected to the antenna 118. The control circuit 104 can continue recording markers and indications of states in memory 102 each time compliance is not met. In some embodiments, the control circuit 104 can aggregate these time periods to determine a total out of compliance time. Further, in some embodiments, the control circuit 104 can determine that the time in which compliance was not met and/or the total out of compliance time exceeds a threshold. In such embodiments, the threshold can be stored in the memory 102.

When the RFID tag 100 is within range of an RFID reader (e.g., when the good or goods associated with the RFID tag are brought into a retail facility or warehouse), the RFID tag 100 transmits an indication of the amount of time in which compliance was not met to the RFID reader. In some embodiments, this indication is data associated with the markers and states. In embodiments in which the control circuit determines a total out of compliance time, the indication can be the total out of compliance in time. Further, in embodiments in which the control circuit 104 determines that the time in which compliance was not met and/or the total out of compliance time exceeds the threshold, the indication of the amount of time in which compliance was not met can be that the threshold has been exceeded.

As previously discussed, in some embodiments, the switch 120 can be a bimetallic strip. The bimetallic strip can contain any combination of suitable materials and be of an appropriate size to fit within the RFID tag 100 (e.g., less than one square inch). Preferably, the bimetallic strip will contain two different conductive metals or alloys. Additionally, the metals or alloys should have coefficients of thermal expansion that differ enough that the switch 120 can alternate between the first position 124 and the second position 122. For example, in some embodiments, the coefficients of thermal expansion of the two metals or alloys differs by at least $1\times10^{-6}$ inches per inch-degrees Fahrenheit. As one example, the switch 120 can be a bimetallic strip comprising an aluminum alloy portion having a coefficient of thermal expansion of $13.1\times10^{-6}$ inches per inch-degrees Fahrenheit and a copper portion having a coefficient of linear expansion of $9.4\times10^{-6}$ inches per inch-degrees Fahrenheit. Other metals and alloys can be used, such a brass, Alloy 280 (Muntz Metal), copper-nickel alloys, stainless steel, nickel alloys, titanium, zinc, and tin, the coefficients of thermal expansion of which are listed in the table below. Additionally, while these metals and alloys have been identified as useful for such a switch 120, those of skill in the art will be able to create bimetallic strips of other materials to accomplish the same ends.

| Material | Coefficient of Thermal Expansion ($1 \times 10^{-6}$ inches per inch-degrees Fahrenheit) |
| --- | --- |
| Aluminum Alloy AA1100 | 13.1 |
| Copper | 9.4 |
| Red Brass | 10.4 |
| Alloy 280 | 11.6 |
| 90-10 Copper-Nickel | 9.5 |
| Stainless Steel AISI 410 | 6.1 |
| Nickel Alloy 200 | 7.4 |
| Titanium | 4.8 |
| Zinc | 18 |
| Tin | 12.8 |

Figure 2:
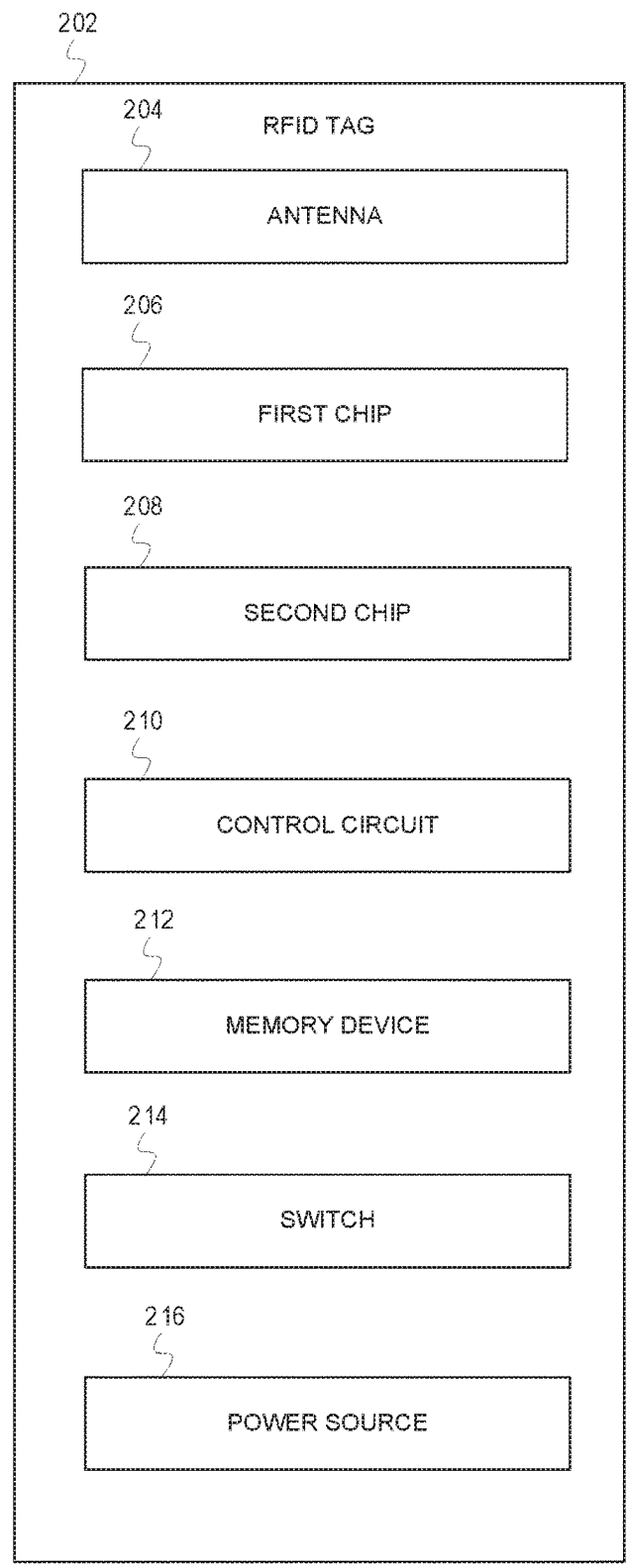
FIG. 2 is a block a diagram of an RFID tag 202 for monitoring condition compliance, according to some embodiments.

FIG. 2 is a block a diagram of an RFID tag 202 for monitoring condition compliance, according to some embodiments. The RFID tag 202 includes an antenna 204, a first chip 206, a second chip 208, a control circuit 210, a memory device 212, a switch 214, and a power source 216. The circuitry of the RFID tag 202 is configured such that the switch 214 switchably connects the first chip 206 and the second chip 208 to the antenna 218. The switch 214 is toggled by the occurrence of a condition. That is, when the condition occurs, the switch 214 alternates from one of the first chip 206 and the second chip 208 to the other of the first chip 206 and the second chip 208. Accordingly, the switch 214 can include materials suitable to activation upon the occurrence of the specific condition monitored. For example, if the condition is a temperature, the switch 214 can include materials that are sensitive to temperature changes, if the condition is a magnetic field, the switch 214 can include materials sensitive to magnetic fields, etc.

The control circuit 210 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 210 is configured (for example, by using corresponding programming as will be well understood by those skilled in the art) to carry out one or more of the steps, actions, and/or functions described herein.

By one optional approach the control circuit 210 operably couples to the memory device 212. The memory device 212 may be integral to the control circuit 210 or can be physically discrete (in whole or in part) from the control circuit 210 as desired. This memory device 212 is local with respect to the control circuit 210 (where, for example, both share a common circuit board, chassis, power supply, and/or housing).

This memory device 212 can serve, for example, to non-transitorily store the computer instructions that, when executed by the control circuit 210, cause the control circuit 210 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

When the switch 214 toggles between the chips, the control circuit 210 writes a marker to the memory device 212 and an indication of a state. In some embodiments, the indication of the state references which chip (i.e., the first chip 206 or the second chip 208) that is connected to the antenna. The markers and the indications of the state can be used to determine an amount of time in which the RFID tag 202 experienced conditions that were not consistent with the condition compliance. For example, if the markers include timestamps, the control circuit 210 can determine the amount of time in which the RFID tag 202 experienced conditions that were not consistent with condition compliance by determining the amount of time that has elapsed between the timestamps. Because the RFID tag 202 is affixed to or near a good, the time in which compliance was not met for the RFID tag 202 is indicative of the amount of time in which compliance was not met for the good.

The power source 216 provides electrical energy to the components of the RFID tag 202. The power source can be of any suitable type, such as a battery, a capacitor, a solar cell, etc. The power source 216 allows the components of the RFID tag 202 to operate even when the RFID tag 202 is not receiving a signal from an RFID reader. In some embodiments, the power source 216 only allows the control circuit 210 to write markers and indications to the memory device 212. In other embodiments, the power source 216 allows the RFID tag 202 to function as an active RFID tag.

Figure 3:
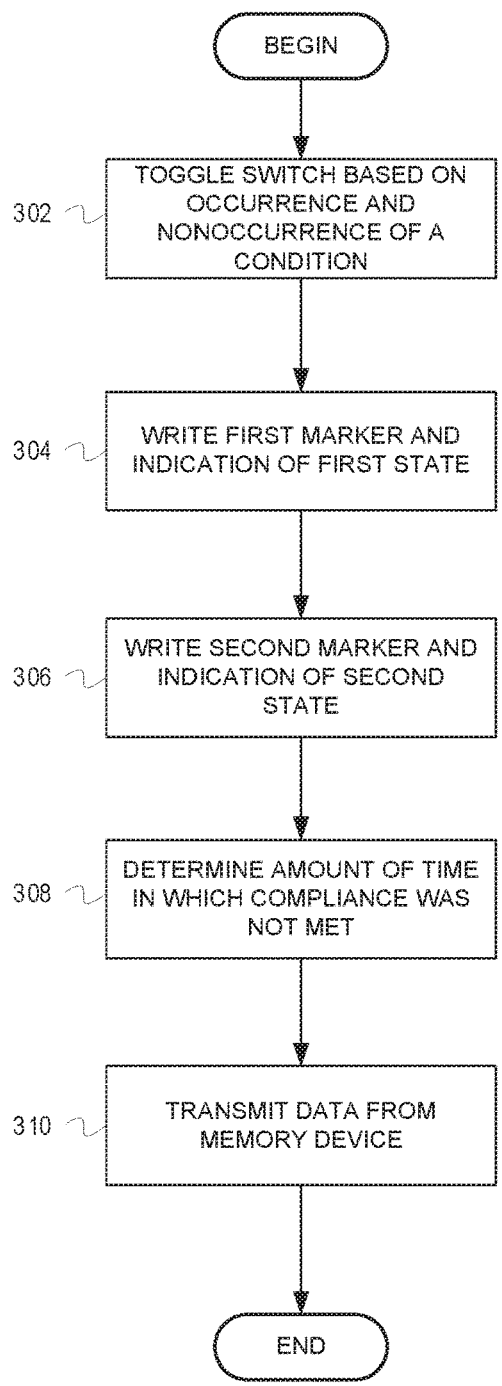
FIG. 3 is a flow chart depicting example operations for monitoring condition compliance with and RFID tag, according to some embodiments.

While the discussion of FIGS. 1 and 2 describe example RFID tags that can be used to monitor condition compliance, the discussion of FIG. 3 provides example operations for using such an RFID tag to monitor condition compliance.

FIG. 3 is a flow chart depicting example operations for monitoring condition compliance with and RFID tag, according to some embodiments. The flow begins at block 302.

At block 302, a switch is toggled based on occurrence and nonoccurrence of a condition. The switch is located within an RFID tag and is part of the RFID tag's circuitry. The RFID tag includes two chips. Each of the two chips can be connected to an antenna. The switch operates to toggle between a first of the two chips being connected to the antenna and a second of the two chips being connected to the antenna. The switch toggles between the first and second switches based on the occurrence of a condition. The condition can be of any type suitable for monitoring. For example, the condition can be based on temperature, humidity or moisture level, magnetic field exposure, light exposure, etc. The componentry of the switch can vary based on the condition to be monitored. Specifically, the componentry of the switch can include materials that are sensitive to the condition being monitored. The flow continues at block 304.

At block 304, a first marker and an indication of a first state are written to a memory device. For example, a control circuit can write the first marker and the indication of the first state to the memory device. When the switch is toggled, a different one of the chips is connected to the antenna. When this occurs, the control circuit writes a marker to the memory device. The marker is indicative of a time, such as a timestamp. The control circuit also writes and indication of a first state to the memory device. The indication of the first state is indicative of compliance with the condition. For example, if the first state is an out of compliance state, the indication of the first state indicates that condition is not currently being complied with. The flow continues at block 306.

At block 306, a second marker and an indication of second state are written to the memory device. For example, the control circuit can write the second marker and the indication of the second state to the memory device. The control circuit writes the second marker and the indication of the second state to memory when the switch is again toggled. That is, if the second state is an in compliance state, the control circuit writes the second marker and the indication of the second state to the memory device when the condition is being complied with. Like the first marker, the second marker is indicative of a time. The indication of the second state is indicative of compliance with the condition. The flow continues at block 308.

At block 308, an amount of time in which compliance was not met is determined. For example, the control circuit can determine an amount of time in which compliance was not determined. In some embodiments, the control circuit determines an amount of time in which compliance was not met based on the markers and the indications of states. For example, if the markers are timestamps, the control circuit can determine and amount of time between the timestamps by subtracted one from the other. Additionally, the control circuit can determine during which periods (i.e., between which markers) compliance was not met based on the indications of the state. The flow continues at block 310.

At block 310, data from the memory device is transmitted. For example, the control circuit can cause data from the memory device to be transmitted via the antenna. In some embodiments, every time the RFID tag encounters and RFID reader, the data from the memory device is transmitted. In other embodiments, the RFID tag may only transmit the data from the memory when it is first read by an RFID reader (i.e., if the same RFID reader reads the RFID tag a second time, the RFID tag will not transmit the data in the memory device to the RFID reader). The data in the memory device is related to the markers and the indications of the state. In some embodiments, the RFID tag transmits the markers and the indications of the state. Additionally, or alternatively, the RFID tag can transmit an amount of time in which compliance was not met.

Generally speaking, pursuant to various embodiments, systems, apparatuses, and methods are provided herein useful to monitoring condition compliance. In some embodiments, an RFID tag for monitoring condition compliance comprises a first chip and a second chip, an antenna, a switch, wherein the switch is configured to switchably connect the first chip to the antenna and the second chip to the antenna based on occurrence of a condition, a memory device, and a control circuit configured to write, in response to a connection between the first chip and the antenna, a first marker and an indication of a first state to the memory device, write, in response to a connection between the second chip and the antenna, a second marker and an indication of a second state to the memory device, determine, based on the second marker and the first marker, an amount of time in which compliance was not met, and transmit, to an RFID reader, an indication of the amount of time in which compliance was not met.

In some embodiments, an apparatus and a corresponding method performed by the apparatus comprises toggling, based on occurrence and non-occurrence of a condition, a switch between a first chip of an RFID tag and a second chip of an RFID tag to switchably connect the first chip of the RFID tag to an antenna and the second chip of the RFID tag to the antenna, writing, in response to a connection between the first chip and the antenna, a first marker and an indication of a first state to a memory device of the RFID tag, writing, in response to a connection between the second chip and the antenna, a second marker and an indication of a second state to the memory device of the RFID tag, determining, based on the second marker and the first marker, an amount of time in which compliance was not met, and transmitting, to an RFID reader, an indication of the amount of time in which compliance was not met.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A radio frequency identification (RFID) tag for monitoring condition compliance, the RFID tag comprising:
   a first chip and a second chip;
   an antenna;
   a switch, wherein the switch is configured to switchably connect the first chip to the antenna and the second chip to the antenna based on occurrence of a condition;
   a memory device; and
   a control circuit, the control circuit configured to:
      write, in response to a connection between the first chip and the antenna, a first marker and an indication of a first state to the memory device;
      write, in response to a connection between the second chip and the antenna, a second marker and an indication of a second state to the memory device;
      determine, based on the second marker and the first marker, an amount of time in which compliance was not met; and
      transmit, to an RFID reader, an indication of the amount of time in which compliance was not met.
2. The RFID tag of claim 1, wherein the switch is one or more of a bimetallic strip, a conductive material, a liquid, and a metallic liquid.
3. The RFID tag of claim 1, wherein the condition is one or more of a temperature, a magnetic field, and a humidity level.
4. The RFID tag of claim 1, wherein the first marker and the second marker are time stamps.
5. The RFID tag of claim 4, wherein the determination of the amount of time in which compliance was not met is based on a difference between the first marker and the second marker.
6. The RFID tag of claim 1, wherein the control circuit is further configured to:
   determine, based on the amount of time in which compliance was not met, a total out of compliance time.
7. The RFID tag of claim 6, wherein the control circuit is further configured to:
   determine that the total out of compliance time exceeds a threshold; and
   transmit, to the RFID reader, an indication that the total out of compliance time exceeds the threshold.
8. The RFID tag of claim 1, wherein the condition is a temperature and the switch comprises one of a bimetallic strip and mercury.
9. The RFID tag of claim 1, wherein the indication of the first state is that the first chip is connected to the antenna and the indication of the second state is that the second chip is connected to the antenna.
10. The RFID tag of claim 1, wherein the switch is a bimetallic strip, wherein the bimetallic strip comprises a first material and a second material, and wherein a difference in a coefficient of thermal expansion for the first material and a coefficient of thermal expansion for the second material is at least $1 \times 10^{-6}$ inches per inch-degrees Fahrenheit.
11. A method for monitoring condition compliance using a radio frequency identification (RFID) tag, the method comprising:
   toggling, based on occurrence and non-occurrence of a condition, a switch between a first chip of an RFID tag and a second chip of the RFID tag to switchably connect the first chip of the RFID tag to an antenna and the second chip of the RFID tag to the antenna;
   writing, in response to a connection between the first chip and the antenna, a first marker and an indication of a first state to a memory device of the RFID tag;
   writing, in response to a connection between the second chip and the antenna, a second marker and an indication of a second state to the memory device of the RFID tag;
   determining, based on the second marker and the first marker, an amount of time in which compliance was not met; and
   transmitting, to an RFID reader, an indication of the amount of time in which compliance was not met.
12. The method of claim 11, wherein the switch is one or more of a bimetallic strip, a conductive material, a liquid, and a metallic liquid.
13. The method of claim 11, wherein the condition is one or more of a temperature, a magnetic field, and a humidity level.
14. The method of claim 11, wherein the first marker and the second marker are time stamps.
15. The method of claim 14, wherein the determination of the amount of time in which compliance was not met is based on a difference between the first marker and the second marker.
16. The method of claim 11, the method further comprising:
   determining, based on the amount of time in which compliance was not met, a total out of compliance time.
17. The method of claim 16, the method further comprising:

determining that the total out of compliance time exceeds a threshold; and transmitting, to the RFID reader, an indication that the total out of compliance time exceeds the threshold.

18. The method of claim 11, wherein the condition is a temperature and the switch comprises one of a bimetallic strip and mercury.

19. The method of claim 11, wherein the indication of the first state is that the first chip is connected to the antenna and the indication of the second state is that the second chip is connected to the antenna.

20. The method of claim 11, wherein the switch is a bimetallic strip, wherein the bimetallic strip comprises a first material and a second material, and wherein a difference in a coefficient of thermal expansion for the first material and a coefficient of thermal expansion for the second material is at least $1\times10^{-6}$ inches per inch-degrees Fahrenheit.

* * * * *